United States Patent
Heinloth et al.

(10) Patent No.: US 9,597,739 B2
(45) Date of Patent: Mar. 21, 2017

(54) INTERNAL MILLING CUTTER

(71) Applicant: Kennametal Inc., Latrobe, PA (US)

(72) Inventors: Markus Heinloth, Postbauer-Heng (DE); Jüergen Thomas Baer, Lichtenau (DE); Jan Gruenler, Königshofen a.d. Heide (DE)

(73) Assignee: KENNAMETAL INC., Latrobe, PA (US)

( * ) Notice: Subject to any disclaimer, the term of this patent is extended or adjusted under 35 U.S.C. 154(b) by 368 days.

(21) Appl. No.: 14/165,910

(22) Filed: Jan. 28, 2014

(65) Prior Publication Data

US 2014/0227048 A1    Aug. 14, 2014

(30) Foreign Application Priority Data

Feb. 11, 2013  (DE) .................... 10 2013 101 311

(51) Int. Cl.
| | |
|---|---|
| *B23B 5/18* | (2006.01) |
| *B23C 5/20* | (2006.01) |
| *B23C 5/12* | (2006.01) |
| *B23C 3/06* | (2006.01) |
| *B23C 5/08* | (2006.01) |

(52) U.S. Cl.
CPC .............. *B23C 5/207* (2013.01); *B23C 3/06* (2013.01); *B23C 5/08* (2013.01); *B23C 5/12* (2013.01); *B23C 2200/0483* (2013.01); *B23C 2210/24* (2013.01); *B23C 2210/503* (2013.01); *B23C 2220/68* (2013.01); *Y10T 407/1906* (2015.01); *Y10T 407/1942* (2015.01)

(58) Field of Classification Search
CPC ........ B23C 2200/0483; B23C 2210/24; B23C 2210/503; B23C 3/06; B23C 5/207; B23C 5/08; B23C 5/12; B23C 2200/123
USPC ......................................... 407/15, 16, 33–36
See application file for complete search history.

(56) References Cited

U.S. PATENT DOCUMENTS

| | | | |
|---|---|---|---|
| 6,273,651 B1 * | 8/2001 | Heinloth | B23C 3/06 407/116 |
| 7,097,393 B2 * | 8/2006 | Satran | B23C 5/12 407/113 |
| 7,402,010 B2 * | 7/2008 | Bauer | B23C 5/2427 407/37 |
| 8,500,375 B2 * | 8/2013 | Heinloth | B23B 5/18 407/113 |
| 8,858,132 B2 * | 10/2014 | Heinloth | B23C 3/06 407/115 |

(Continued)

FOREIGN PATENT DOCUMENTS

| | | |
|---|---|---|
| DE | 101 44 542 C1 | 9/2001 |
| DE | 60 2004 004 641 T2 | 4/2003 |
| JP | 2002307228 A | 10/2002 |

*Primary Examiner* — Sara Addisu
(74) *Attorney, Agent, or Firm* — Matthew S. Bedsole

(57) ABSTRACT

An internal milling cutter for producing a recess terminating in a radius in a workpiece, in particular for milling a crankshaft, comprises a tool holder having interchangeable cutting inserts detachably attached thereto. For the production of the radius, a plurality of first interchangeable cutting inserts are provided, which are arranged one after another in the direction of cut and have cutting edges which produce complementary portions of the radius, wherein the first interchangeable cutting inserts for producing the radius are identically configured.

23 Claims, 3 Drawing Sheets

(56) References Cited

U.S. PATENT DOCUMENTS

| | | | | |
|---|---|---|---|---|
| 8,931,984 B2 * | 1/2015 | Zeller | ................ | B23F 1/00 409/1 |
| 9,144,851 B2 * | 9/2015 | Bhagath | ................ | B23C 5/08 |
| 2008/0240871 A1 * | 10/2008 | Bar | ................ | B23C 5/08 407/35 |
| 2009/0052997 A1 * | 2/2009 | Shimizu | ................ | B23C 3/06 407/34 |
| 2012/0076599 A1 * | 3/2012 | Heinloth | ................ | B23C 3/06 409/131 |
| 2013/0294849 A1 * | 11/2013 | Heinloth | ................ | B23C 5/08 407/45 |
| 2014/0010606 A1 * | 1/2014 | Sagstrom | ................ | B23C 5/08 407/51 |

* cited by examiner

INTERNAL MILLING CUTTER

CLAIM TO PRIORITY

This application is a National entry application of German Application No. 102013101311.2, filed on Feb. 11, 2013, the entire contents of which is incorporated herein by reference.

FIELD OF THE INVENTION

The invention relates to an internal milling cutter for producing in a workpiece a recess terminating in a radius, comprising a tool holder and interchangeable cutting inserts detachably attached thereto, wherein, for the production of the radius, a plurality of first interchangeable cutting inserts are arranged one after another in the direction of cut, having cutting edges which produce complementary portions of the radius.

BACKGROUND OF THE INVENTION

An internal milling cutter is an annular milling cutter on the inner periphery of which are arranged several cutting edges, which are generally provided on interchangeable cutting inserts. For the machining of the workpiece, the rotating ring is moved in space such that the inner periphery of the ring, in that region of the workpiece which is to be machined, is moved radially inward to enable the cutting edges to cut a recess in the workpiece.

Internal milling cutters are used in the manufacture of crankshafts, for instance, for machining of the bearing seats. Both the seats for the main bearings and those for the pin bearings can be machined. Internal milling cutters are here used, for instance for roughing, in order to remove excess material to essentially the final desired measures.

In the case of eccentrically mounted workpieces, for instance the pin bearings of a crankshaft, the internal milling cutter, in addition to its spinning about the center point of the milling cutter, which spinning is necessary to generate the cutting force, can also move in a circular path about the workpiece in order to machine the latter on the whole of its periphery. With an appropriate control system, it is possible also to make the workpiece rotate in an eccentric motion in order to aid the milling process.

To the inner periphery of the milling cutter are generally attached several groups of interchangeable cutting inserts. For the production of a specific axial portion, each of the interchangeable cutting inserts is assigned to the recess cut into the workpiece by the milling cutter.

In FIGS. 1 and 2, this is represented for an internal milling cutter known from the prior art. FIG. 1 shows a portion of a tool holder of the internal milling cutter, which portion is equipped with a group of interchangeable cutting inserts A-D which produces the periphery cut into the workpiece and represented in FIG. 2 (see line S).

The group of cutting inserts A D which is shown in FIG. 1 is repeated in identical assembly and orientation along the periphery of the milling cutter. The exact number of cutting inserts in such a group, and the number of groups over the periphery of the milling cutter, are dependent, of course, on the workpiece to be machined and, in particular, on the dimensions of the internal milling cutter.

The peripheral surface (shown in cross section in FIG. 2) which is cut into the workpiece by the milling cutter and has the peripheral line L is obtained by assembly of the cutting edges of the group of interchangeable cutting inserts A D from FIG. 1, viewed in the peripheral direction of the tool holder. In FIG. 2, all the cutting inserts A D are rotated diagrammatically from their axial position into a radial plane. The assembled sectional line of all interchangeable cutting inserts of the shown group is thereby discernible.

In FIG. 2 it can be seen that the recess produced by the internal milling cutter terminates on both sides, corresponding to the peripheral margins of the internal milling cutter, in a radius of defined curvature. This radius is produced by the interplay of a plurality of interchangeable cutting inserts A, B, C. In this case, the radius is respectively cut by cutting edges on three individual cutting inserts A, B, C. When the tool is advanced in the radial direction in the direction of cut S, the interchangeable cutting insert A, for instance, first comes into contact with the workpiece, then the laterally outer cutting edge of the interchangeable cutting insert B, and finally the laterally outer cutting edge of the interchangeable cutting insert C. The contour L shown in FIG. 1 for the radius is cut by the interchangeable cutting inserts in combination.

The radius is in this case identical on both peripheral sides of the internal milling cutter, but is configured, of course, in mirror image.

All three interchangeable cutting inserts A, B, C are configured differently in terms of their geometry and size. Three different types of interchangeable cutting inserts are thus used solely to produce the radius.

That portion of the line cut into the workpiece by the internal milling cutter which lies between the two radii is produced by five interchangeable cutting inserts D of a further type, which in turn have a different form than the interchangeable cutting inserts A, B and C.

SUMMARY OF THE INVENTION

The object of the invention is to design an internal milling cutter having interchangeable cutting inserts more simply and more cheaply.

According to the invention, this is achieved with an internal milling cutter for producing in a workpiece a recess terminating in a radius, in particular for milling a crankshaft, comprising a tool holder and interchangeable cutting inserts detachably attached thereto, wherein, for the production of the radius, a plurality of first interchangeable cutting inserts are arranged one after another in the direction of cut, having cutting edges which produce complementary portions of the radius, wherein the first interchangeable cutting inserts for producing the radius are identically configured, that is to say identical parts are used. In contrast to the previously known solutions, several types of interchangeable cutting inserts are thus not necessary to produce the radius, but rather all the individual portions of the radius are cut with identical interchangeable cutting inserts. These interchangeable cutting inserts can be arranged in the tool holder in different positions and orientations in order to complement one another to form the desired radius.

Preferably, the radius is produced by two first interchangeable cutting inserts having complementary cutting edges. The reduction to exactly two interchangeable cutting inserts means saving of an interchangeable cutting insert in relation to the prior art.

The two first interchangeable cutting inserts which form the radius are preferably arranged on one of the peripheral margins of the tool holder and are, in particular, those interchangeable cutting inserts present on the tool holder which are situated axially farthest out and to the side.

The first interchangeable cutting inserts are preferably of disk-shaped configuration and are oriented with one of their end faces substantially perpendicular to the direction of cut. The peripheral margin can thus be used as the cutting edge. Moreover, the interchangeable cutting insert can be shaped very symmetrically, which enables many cutting edges to be configured thereon.

The fastening of the interchangeable cutting insert to the tool holder is preferably realized such that a central fastening screw engages on the tool holder roughly parallel to the peripheral direction, and not, as in traditional solutions, such that the fastening opening and the fastening screw are oriented substantially parallel to the radial direction of the internal milling cutter.

Such an orientation offers the advantage, for instance, due to the geometry of the interchangeable cutting insert, that in its manufacture from a sintered material, during pressing in a pressing tool, the shape of the end faces can be defined essentially already in the pressing tool. In this way, a positive chip angle in relation to the workpiece can be achieved in the mounted state of the interchangeable cutting insert, for instance without the need for substantial reworking after the sintering of the interchangeable cutting insert.

A suitable geometry for the first interchangeable cutting inserts is, for instance, of the kind which has rounded and straight peripheral sections, in particular a circular disk having flat peripheral portions.

Rounded and straight portions along the periphery of the interchangeable cutting insert preferably alternate. For instance, three rounded and three straight portions can respectively be provided.

Each of the rounded portions advantageously forms a cutting edge, so that an interchangeable cutting insert of this type has at least three cutting edges, or even six cutting edges if configured as an indexable cutting insert.

As a result of the more symmetrical shape in comparison to the previously used interchangeable cutting inserts for producing the radius, a higher number of cutting edges per cutting insert can be realized.

On the tool holder is advantageously provided at least one contact surface for the positioning and indexing of the interchangeable cutting insert, wherein the contact surface can bear, in particular, against a straight peripheral portion. Via the position and orientation of the contact surfaces, the exact positioning and orientation of the first interchangeable cutting inserts for producing the radius can be easily preset, so that their cutting edges are constantly in exactly the position which is necessary in order to shape the corresponding portion of the radius.

If the peripheral geometry of the first interchangeable cutting inserts is symmetrically designed, the contact surfaces can also at the same time be used for indexing of the interchangeable cutting insert.

It is advantageous if the rounded portions of the first interchangeable cutting inserts respectively have a curvature corresponding to the radius to be produced. The straight portions, which delimit the curved portions, preferably also at the same time delimit the radius segment cut by the respective first interchangeable cutting insert.

To the side of the first interchangeable cutting inserts, further, second interchangeable cutting inserts can be provided on the tool holder in order to cut into the workpiece portions of the recess which adjoin the radius, wherein all second interchangeable cutting inserts are preferably identically configured. The geometry of the second interchangeable cutting inserts is normally, however, different than the geometry of the first interchangeable cutting inserts. Preferably, as the second interchangeable cutting inserts, traditional disk-shaped or plate-shaped cutting inserts, for instance of square cross section, are used, which are preferably installed with their narrow side in the direction of cut, so that their end face points radially inward with respect to the internal milling cutter. In this way, only two different types of interchangeable cutting inserts are needed in total.

It is possible to arrange first interchangeable cutting inserts for producing a radius on both peripheral margins of the tool holder, so that a radius is configured in the workpiece at both axial ends of the recess. In this case, the first cutting inserts which produce the radius are advantageously arranged on both peripheral margins of the tool holder such that they are mutually offset in the direction of cut, in order to achieve an even load upon the interchangeable cutting inserts when in contact with the workpiece.

The portion of the recess between the two radii can only be cut by the second interchangeable cutting inserts. The first interchangeable cutting inserts, on the other hand, are preferably used solely to cut the radius.

The described group of interchangeable cutting inserts is normally repeated in identical geometry and arrangement along the periphery of the tool holder. In such a group, for example four first interchangeable cutting inserts are provided, namely two on each peripheral margin of the tool holder, as well as, for example, eight second interchangeable cutting inserts, which are arranged on the surface of the tool holder between the first interchangeable cutting inserts.

According to a preferred embodiment, the tool holder comprises a main body and a plurality of cassettes, which latter are detachably fastened to the main body and to which, respectively, at least one interchangeable cutting insert is fastened. The use of cassettes allows an exchange of cutting inserts or groups of cutting inserts to be performed more rapidly and increases the service life of the internal milling cutter.

Preferably, each of the first interchangeable cutting inserts is fastened to an exchangeable cassette. In particular, the orientation and position of the interchangeable cutting insert are thus adjustable before this is inserted into the main body.

Alternatively, it is also of course possible to arrange a plurality of interchangeable cutting inserts, and, for instance, even the entire described group of first and second interchangeable cutting inserts, on a single cassette, so that the entire group, for instance, can be jointly exchanged.

The internal milling cutter according to the invention can be used, for instance, to machine crankshafts of marine diesel engines and, in particular, the main bearings and pin bearings of such crankshafts. Other purposes of use are, of course, likewise conceivable. Equally, the invention can be used for internal milling cutters of smaller or larger dimensions.

BRIEF DESCRIPTION OF THE DRAWINGS

The invention is described in greater detail below on the basis of an illustrative embodiment with reference to the appended drawings. In the drawings.

DETAILED DESCRIPTION OF THE INVENTION

Figure 1:
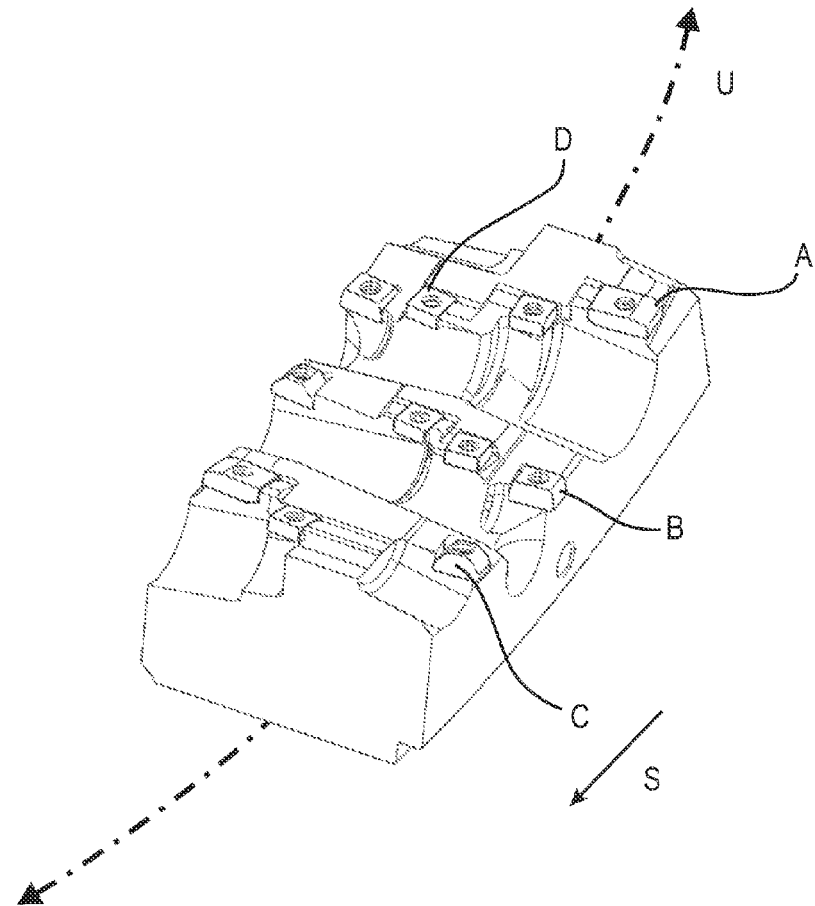
FIG. 1 shows a schematic perspective view of a detail of a tool holder, having interchangeable cutting inserts, of a traditional internal milling cutter.
Figure 2:
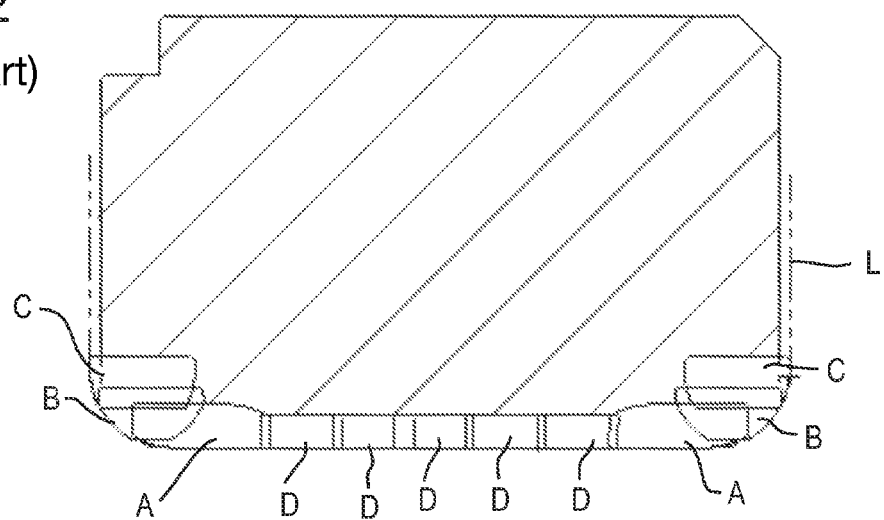
FIG. 2 shows a radial sectional view of the tool holder according to FIG. 1.

The tool holder 10 (shown in FIG. 3) of an internal milling cutter (not further represented in detail) possesses a main body 14, which is configured in the form of a ring which is closed in the peripheral direction U. On its radial inner side, the tool holder 10 is equipped with cutting inserts, which serve to cut a recess into a workpiece 15 (see FIG. 5). The direction of cut S is determined, for example, by the rotational direction of the internal milling cutter and thus of the tool holder 10. In this respect, the internal milling cutter corresponds to that which is described above in relation to FIGS. 1 and 2.

In the case of the shown internal milling cutter, however, only two different types of cutting inserts are provided, namely interchangeable cutting inserts 16 of a first type, for producing the radius on the margin of the recess, and interchangeable cutting inserts 18 of a second type, which machine the region of the workpiece 15 between the radii.

Figure 3:
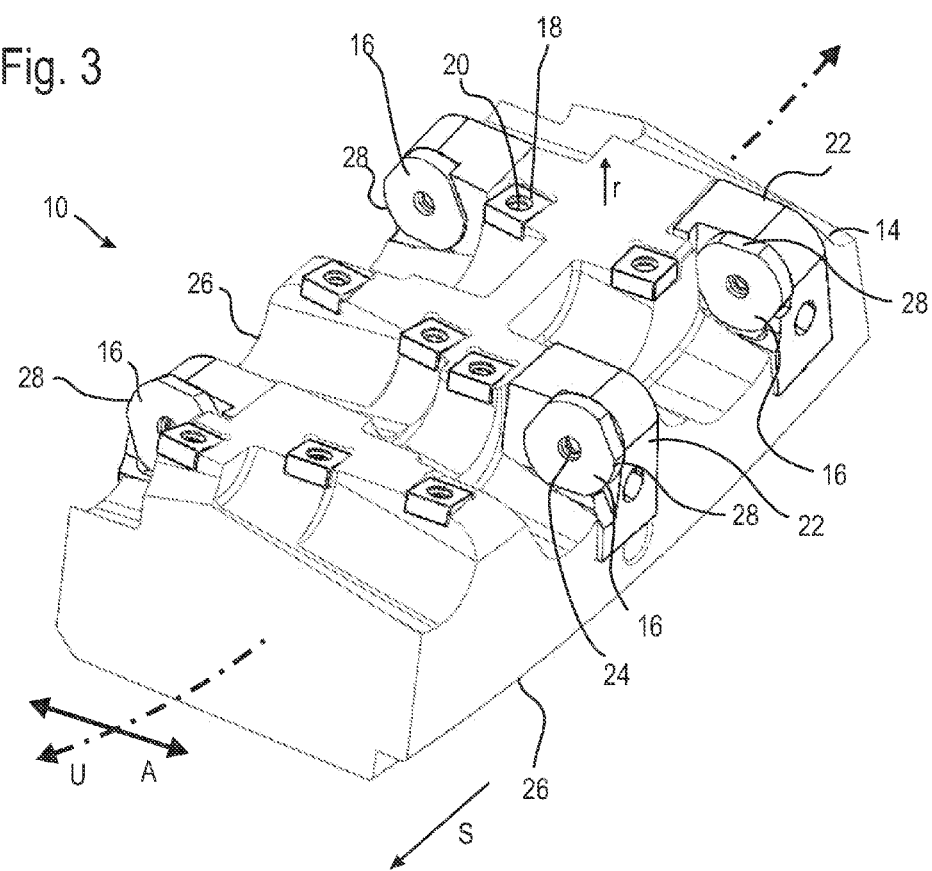
FIG. 3 shows a schematic perspective detail of a tool holder of an internal milling cutter according to the invention having interchangeable cutting inserts.

In FIG. 3, a group of interchangeable cutting inserts 16, 18 is represented, which group has all cutting inserts which are needed in order to machine each region of the recess in the workpiece 15 over the axial width of the recess.

The represented group is repeated a number of times along the peripheral direction U of the tool holder 10, wherein the entire periphery U of the tool holder 10 is equipped as evenly as possible with cutting inserts. For an internal milling cutter for machining a crankshaft of a marine diesel engine, 18 such groups, for instance, are distributed over the periphery of the internal milling cutter.

In the group of interchangeable cutting inserts, a plurality of first interchangeable cutting inserts 16 (i.e. interchangeable cutting inserts of the first type) are arranged along the two peripheral margins 26 of the tool holder 10. In addition, a plurality of second interchangeable cutting inserts 18 (i.e. interchangeable cutting inserts of the second type) are arranged alongside the first interchangeable cutting inserts 16 in the axial direction A.

In this example, all the second interchangeable cutting inserts 18 (of which in FIG. 3, for reasons of clarity, only one is provided with reference symbols) are fastened directly to the main body 14. The fastening is realized by a screw (not represented here) led through a central opening 20. The corresponding thread opening in the main body runs substantially radially.

All first interchangeable cutting inserts 16, on the other hand, are respectively fastened to a dedicated cassette 22, likewise by means of a screw reaching through a central opening 24. The cassettes 22 are in turn screwed to the main body 14 (not represented in detail here).

All the interchangeable cutting inserts 16, 18 are designed to be detachable and exchangeable. All of the cassettes 22 are also of detachable and exchangeable configuration, so that both individual interchangeable cutting inserts 16, 18 of each type and individual cassettes 22 can be removed from the main body 14 and reattached there.

The first interchangeable cutting inserts 16 serve to produce the radius, as is illustrated by the contour L (represented in FIG. 5) cut into the workpiece 15 by the internal milling cutter. For this purpose, on each peripheral margin 26 of the tool holder 10 are arranged a plurality of, in this case respectively two, first interchangeable cutting inserts 16, which have complementary cutting edges 28, wherein both cutting edges 28 together cut the radius (shown in FIG. 5) into the workpiece 15 along a peripheral margin 26.

The first interchangeable cutting inserts 16 are here of disk-shaped configuration and are oriented with one of their end faces roughly perpendicular to the direction of cut S or to the peripheral direction U. The oppositely directed end face bears against the cassette 22.

Each interchangeable cutting insert 16 has alternately rounded and straight peripheral portions, wherein the rounded peripheral portions form the cutting edges 28. The straight peripheral portions 29 are oriented such that they do not come into contact with the workpiece 15. Each of the cutting edges 28 and each of the straight peripheral portions 29 extends in this example over an angle of about 60°. Of course, a different geometry of the peripheral portions can also be chosen.

The two end faces of the interchangeable cutting insert 16 are here identically configured, so that this can be reversed and thus has six utilizable cutting edges 28. The shape, upon rotation through 120°, is symmetrical. The straight peripheral portions 29 can be used for indexing to contact surfaces 30 on the cassette 22 or on the main body 14.

On the other hand, all the second interchangeable cutting inserts 18 are in this example like traditional plate-shaped cutting inserts of roughly square cross section which are mounted on the tool holder 10 such that one of the narrow sides points in the direction of cut S and the two end faces lie roughly perpendicular to the radial direction r.

Figure 4:
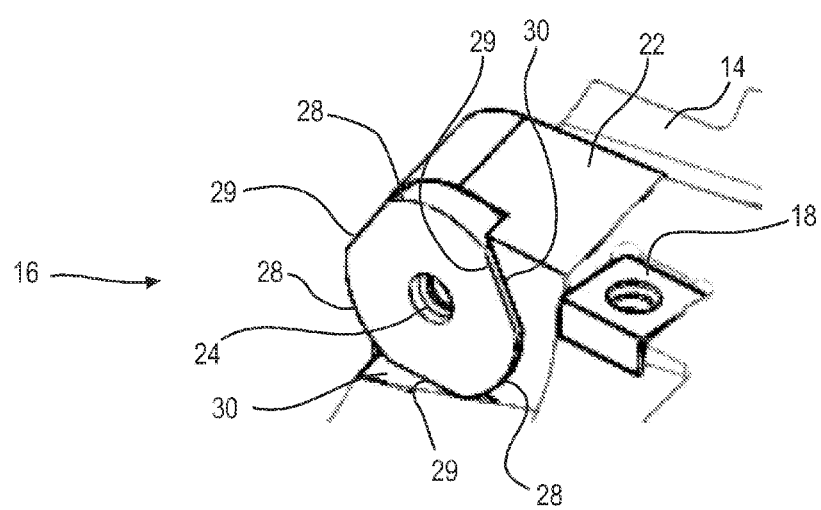
FIG. 4 shows an enlarged detail of the tool holder from FIG. 3.

FIG. 4 shows an enlarged representation of one of the cassettes 22 having a first interchangeable cutting insert 16. It is here evident that two contact surfaces 30 are provided, which form an acute angle and against which respectively one of the straight peripheral portions 29 bears with its full face. The rear end face bears with its full face against the cassette 22. In this way, the first interchangeable cutting insert 16 is defined in its position, secured against twisting and supported in several regions. If another cutting edge 28 of this interchangeable cutting insert 16 is to be used, then the latter is loosened, rotated through 120° and screwed down again.

For simplified representation, the end faces of the interchangeable cutting inserts 16 are here shown flat. It is advantageous, however, to configure respectively on the end faces diverse chip breaker surfaces or recesses, which define the shape of the cutting edges 28 such that a desired positive cutting angle to the workpiece 15 is achieved.

The curvature of the cutting edges 28 corresponds to the curvature of the radius to be produced in the workpiece 15. In this example, each of the cutting edges 28 forms a circular arc.

Figure 5:
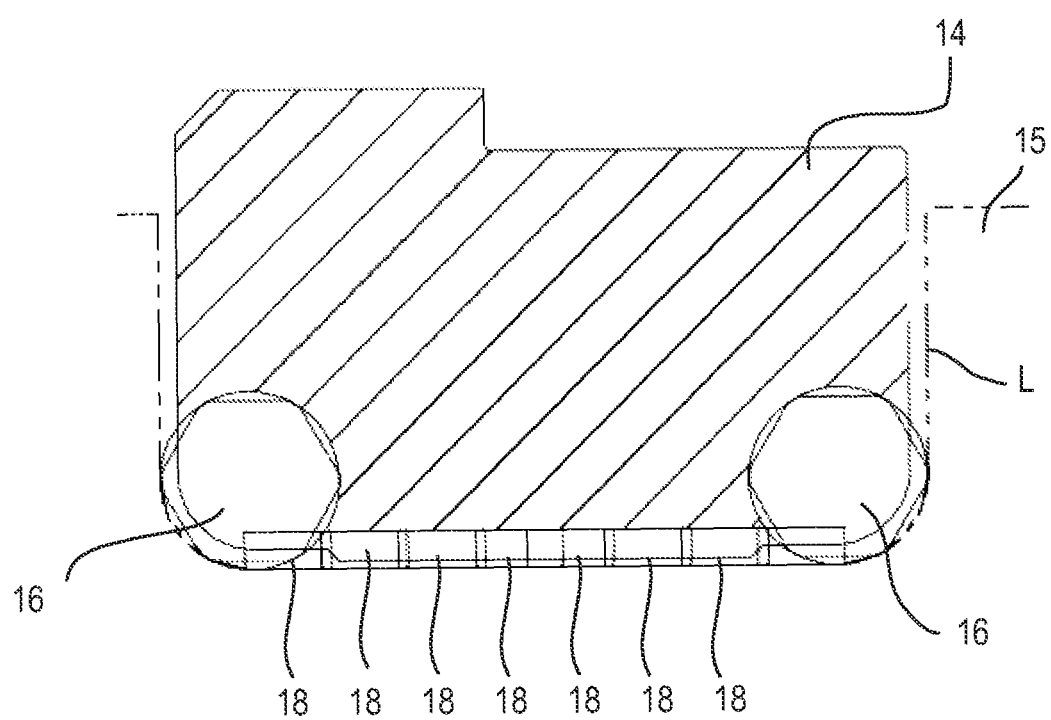
FIG. 5 shows a radial sectional view of the milling cutter according to FIG. 3.

The radius is cut by two first interchangeable cutting inserts 16 arranged directly one behind the other along the periphery of the tool holder 10. In the case of the group of cutting inserts which is shown in FIG. 3, on the peripheral margin 26 located on the right-hand side in FIG. 3 firstly the lower of the two first interchangeable cutting inserts 16 enters with its active, top cutting edge 28 into contact with the workpiece 15 and cuts the, with respect to the recess in the workpiece 15, lower part of the radius. Next, the upper of the two first interchangeable cutting inserts 16 comes into contact with the workpiece 15 and cuts the, with respect to the recess in the workpiece 15, adjacent, lower part of the radius with its active cutting edge 28. The two active cutting edges 28 of these two interchangeable cutting inserts 16 are positioned such that they are twisted relative to each other, so that their cutting effect, as shown in FIG. 5, is mutually complementary.

On the left-hand side peripheral margin 26 of the tool holder 10, a mirror-image arrangement of the first interchangeable cutting inserts 16 is chosen. However, the first interchangeable cutting inserts 16 are arranged, such that they are respectively mutually offset in the peripheral direction U, on the right-hand and left-hand peripheral margin 26 in the group of cutting inserts.

In the example which is shown here, the portion of the line, cut into the workpiece 15 by the internal milling cutter, between the radii in the radial section is configured straight, though other shapes could also be realized by an appropriate arrangement and shaping of the second interchangeable cutting inserts 18.

What is claimed is:

1. An internal milling cutter for producing in a workpiece a recess terminating in a radius, the milling cutter comprising a tool holder and a plurality of first interchangeable cutting inserts detachably attached thereto, wherein the plurality of first interchangeable cutting inserts are arranged one after another in the direction of cut having cutting edges which produce portions of the radius, wherein the plurality of first interchangeable cutting inserts are identical to each other, and wherein the plurality of first interchangeable cutting inserts are of disk-shaped configuration and are oriented with one end face substantially perpendicular to the direction of cut.

2. The internal milling cutter as claimed in claim 1, wherein the radius is formed by two of the plurality of first interchangeable cutting inserts having cutting edges.

3. The internal milling cutter as claimed in claim 1, wherein the plurality of first interchangeable cutting inserts have rounded and straight peripheral portions.

4. The internal milling cutter as claimed in claim 3, wherein the rounded and straight peripheral portions alternate when coming into contact with the workpiece.

5. The internal milling cutter as claimed in claim 3, wherein the tool holder is provided with at least one contact surface for the positioning and indexing of the straight peripheral portion of the plurality of first interchangeable cutting inserts.

6. The internal milling cutter as claimed in claim 3, wherein the rounded portions have a curvature corresponding to the radius to be produced on the workpiece.

7. The internal milling cutter as claimed in claim 1, further comprising a plurality of second interchangeable cutting inserts provided on the tool holder in order to cut portions of a recess which adjoin the radius into the workpiece, wherein the plurality of second interchangeable cutting inserts are identical to each other.

8. The internal milling cutter as claimed in claim 7, wherein the portion of the recess adjoining the radius is produced only by the plurality of second interchangeable cutting inserts.

9. The internal milling cutter as claimed in claim 1, wherein the plurality of first interchangeable cutting inserts are arranged along a periphery of the tool holder.

10. The internal milling cutter as claimed in claim 9, wherein the plurality of first interchangeable cutting inserts are offset with respect to each other in the direction of cut.

11. The internal milling cutter as claimed in claim 1, wherein the tool holder comprises a main body and a plurality of cassettes detachably fastened to the main body, and wherein at least one of the plurality of first interchangeable cutting inserts is fastened to a respective cassette.

12. The internal milling cutter as claimed in claim 1, wherein each of the plurality of first interchangeable cutting inserts is fastened to a cassette that is detachably fastened to the tool holder.

13. An internal milling cutter for producing in a workpiece a recess terminating in a radius, the milling cutter comprising a tool holder and a plurality of first interchangeable cutting inserts detachably attached thereto, and a plurality of second interchangeable cutting inserts provided on the tool holder in order to cut portions of a recess which adjoin the radius into the workpiece, wherein the plurality of second interchangeable cutting inserts are identical to each other, wherein the plurality of first interchangeable cutting inserts are arranged one after another in the direction of cut having cutting edges which produce portions of the radius, wherein the plurality of first interchangeable cutting inserts are identical to each other, and wherein the plurality of first interchangeable cutting inserts are of disk-shaped configuration and are oriented with one end face substantially perpendicular to the direction of cut.

14. The internal milling cutter as claimed in claim 13, wherein the radius is formed by two of the plurality of first interchangeable cutting inserts having cutting edges.

15. The internal milling cutter as claimed in claim 13, wherein the plurality of first interchangeable cutting inserts have rounded and straight peripheral portions.

16. The internal milling cutter as claimed in claim 15, wherein the rounded and straight peripheral portions alternate when coming into contact with the workpiece.

17. The internal milling cutter as claimed in claim 15, wherein the tool holder is provided with at least one contact surface for the positioning and indexing of the straight peripheral portion of the plurality of first interchangeable cutting inserts.

18. The internal milling cutter as claimed in claim 15, wherein the rounded portions have a curvature corresponding to the radius to be produced on the workpiece.

19. The internal milling cutter as claimed in claim 13, wherein the plurality of first interchangeable cutting inserts are arranged along a periphery of the tool holder.

20. The internal milling cutter as claimed in claim 19, wherein the plurality of first interchangeable cutting inserts are offset with respect to each other in the direction of cut.

21. The internal milling cutter as claimed in claim 13, wherein the portion of the recess adjoining the radius is produced only by the plurality of second interchangeable cutting inserts.

22. The internal milling cutter as claimed in claim 13, wherein the tool holder comprises a main body and a plurality of cassettes detachably fastened to the main body, and wherein at least one of the plurality of first changeable cutting inserts is fastened to a respective cassette.

23. An internal milling cutter for producing in a workpiece a recess terminating in a radius, the milling cutter comprising a tool holder and a plurality of first interchangeable cutting inserts detachably attached thereto, and a plurality of second interchangeable cutting inserts provided on the tool holder in order to cut portions of a recess which adjoin the radius into the workpiece, wherein the plurality of second interchangeable cutting inserts are arranged one after another in the direction of cut having cutting edges which produce portions of the radius, wherein the plurality of first interchangeable cutting inserts are identical to each other, wherein the plurality of first interchangeable cutting inserts have rounded and straight peripheral portions, wherein the plurality of first interchangeable cutting inserts each has alternately rounded and straight peripheral portions, and wherein the straight peripheral portions are oriented such that they do not come into contact with the workpiece.

* * * * *